INFORMATION STORAGE APPARATUS USING A RECORD MEDIUM

Filed May 7, 1956 5 Sheets-Sheet 1

INVENTORS
NORMAN M. LOURIE
KENNETH E. PERRY
BY
[signature]
ATTORNEY

INVENTORS
NORMAN M. LOURIE
KENNETH E. PERRY
BY [signature]
ATTORNEY

INFORMATION STORAGE APPARATUS USING A RECORD MEDIUM

Filed May 7, 1956 5 Sheets-Sheet 3

INVENTORS
NORMAN M. LOURIE
KENNETH E. PERRY
BY Henry L. Hanson
ATTORNEY

INFORMATION STORAGE APPARATUS USING A RECORD MEDIUM

Filed May 7, 1956 5 Sheets-Sheet 4

INVENTORS
NORMAN M. LOURIE
KENNETH E. PERRY
BY Henry L. Hanson
ATTORNEY

Jan. 9, 1962 N. M. LOURIE ETAL 3,016,522

INFORMATION STORAGE APPARATUS USING A RECORD MEDIUM

Filed May 7, 1956 5 Sheets-Sheet 5

INVENTORS
NORMAN M. LOURIE
KENNETH E. PERRY
BY Henry L. Hanson
ATTORNEY

United States Patent Office 3,016,522

Patented Jan. 9, 1962

3,016,522

INFORMATION STORAGE APPARATUS USING A RECORD MEDIUM

Norman M. Lourie, Watertown, and Kenneth E. Perry, Newton, Mass., assignors, by mesne assignments, to Minneapolis-Honeywell Regulator Company, a corporation of Delaware Filed May 7, 1956, Ser. No. 583,138
9 Claims. (Cl. 340—174.1)

A general object of the present invention is to provide a new and improved method and apparatus for storing information on a record medium. More specifically the present invention is concerned with an interlaced block system of recording information on a record storage medium, such as an elongated record storage tape, where novel means are provided for distinctly indicating the active sections of the tape.

One requirement of a data processing machine or computer is that a large amount of informational storage be available. A convenient means for information storage is an elongated record tape which may well take the form of a tape having a magnetizable surface to which the information to be stored may be transferred. The information on the tape is transferred thereto by means of an informational transfer head, where the tape is moved relative to the head. When a magnetic tape is used, it is generally driven past the transfer head at a relatively high predetermined speed in order to make an efficient transfer of the information between the tape and the transfer head.

It has been found to be desirable to record the information on the record tape in discrete blocks or spaces each of which are spaced along the length of the tape. The information stored is frequently required a single block at a time and the record tape will accordingly be advanced past the transfer head a single block at a time. When the tape is operated in this manner, it means that the tape must be brought up to speed before there is any information transfer and then after the transfer area or block has been passed, the tape must be stopped before the tape has reached the next active space or block on the tape. In the conventional tape storage system this means that a substantial space is required between the blocks to provide for the starting and stopping of the tape. There is consequently a considerable loss of useful storage space on the record tape thus considerably increasing the cost per unit of information stored. On record tapes this loss of useful space may make the storage method too costly for practical application when compared with other forms of storage.

Economical use of the storage tape may be achieved by apparatus of the type shown in the present invention wherein the information stored is placed in blocks which are alternately interlaced. The tape is divided into a first and second logical half. The first half will use every other block or space. When the second logical half of the tape is used, the blocks between the active blocks of the first logical half will be utilized. In this way, the tape when driven on the first logical half will be stopped over the blocks or spaces utilized when the tape is being driven on the second logical half. This insures that there will be an adequate space provided on the tape so that the tape may be brought up to speed before the information is transferred with respect to the data transfer head and the tape may be stopped without danger of running into the next active block on that half of the tape.

When an interlaced block system of recording is used, it is necessary to know when a desired block of information is about to come under the reading head. It is further necessary to know when the physical end of the tape, the logical middle, has been reached so that adequate control action may be effected to transfer the tape control signals to reverse the direction of tape movement.

It is accordingly a more specific object of the present invention to provide a new and improved system for indicating the position of and controlling the motion of a record tape by a series of block mark signals.

A further object of the present invention is to provide an apparatus for distinctly identifying a selected block of information on a record tape regardless of which direction the tape is being driven past an information transfer head.

Still another more specific object of the present invention is to provide an apparatus wherein an elongated record tape is divided into two logical halves as divided by record spaces or blocks which are alternately active depending upon the logical half of the tape being used in combination with a record marker on the tape which characteristically identifies each block and the middle of the tape.

A further object of the invention is to provide a tape storage apparatus wherein data may be stored in every other space or block on the tape as the tape is moved in one direction and in the in-between spaces when the tape is moved in the opposite direction with block mark signals for indicating the block it is desired to make active.

The foregoing and other objects of the present invention will be apparent upon a consideration of the claims and of the following description and drawings, the latter of which illustrate a preferred embodiment of the invention. Of the drawings:

FIGURE 1

Figure 1:
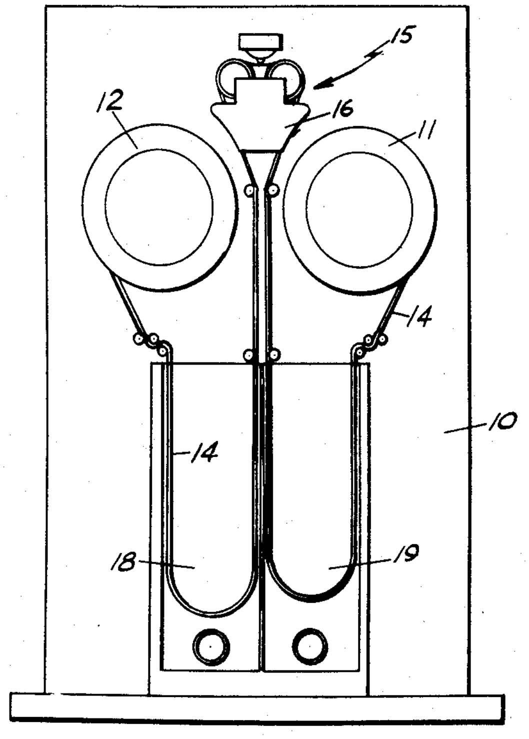
FIGURE 1 is a diagrammatic showing of a tape handling mechanism adapted for use in the present invention.

Referring first to FIGURE 1 the numeral 10 represents a panel upon which are mounted the record tape handling mechanisms of the present invention. On the panel are mounted a pair of tape supply reels 11 and 12, said supply reels carrying a tape 14 which is adapted to be drawn from one reel to the other past an informational transfer mechanism 15. For purposes of explanation of the present invention, it will be assumed that the tape 14 is a magnetic tape on which electrical informational signals may be stored by producing a magnetized pattern on the surface of the tape. The informational transfer mechanism will be described as an electromagnetic information transfer head which will transfer electrical information pulses into flux variations which may be stored on tape 14. The transfer head is also used for reading the information after it is stored on the tape. As will be apparent from the explanation, other types of record tapes, such as punched tape, may be used.

The numeral 16 indicates a tape motion controlling apparatus which is adapted to drive a tape in a forward or a reverse direction and to stop the tape. This apparatus may take any of several forms, a representative form being shown in a co-pending application of Harold W. Beveridge, Serial Number 501,605, fi.ed April 15, 1955, now Patent No. 2,956,718.

The tape 14 is maintained under tension on either side of the information transfer head 15 by a pair of loop chambers 18 and 19. These loop chambers are arranged so that a vacuum is maintained under tape 14 and draws the tape toward the bottom of the chamber. Suitable loop length detecting means, not shown, are used to control the operation of the reels 11 and 12 so that there is always a predetermined amount of tape in each of the chambers 18 and 19 so that the tape may be readily moved by the tape motion control means, 16.

FIGURE 2

Figure 2:
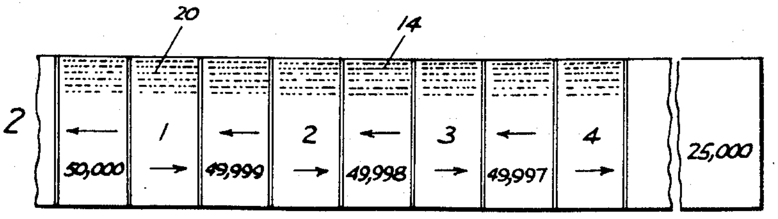
FIGURE 2 shows the arrangement of the informational blocks on the storage tape of the present apparatus.

FIGURE 2 is a showing of how the information is stored on the record tape 14. As pointed out above, it is desirable to utilize a maximum amount of space on the tape while arranging the tape information so that the tape may be started and stopped between each individual reading.

The information stored in the individual blocks is preferably stored along the several information tracks 20 which may be recorded by a suitable multi-channel information transfer head. This information is stored serially in binary form as "1's" or "0's" in any desired manner.

In FIGURE 2, only a small section of the representative record tape 14 is shown. The tape is divided into a number of information blocks each numbered in the order in which they are numerically read, the reading taking place on every other block. Thus, every other block from the beginning is numbered 1, 2, 3, 4, etc. until the physical end of the tape has been reach at block 25,000, for example. As soon as the physical end of the tape has been reached, the apparatus will be reversed and the tape will be driven in the opposite direction. When driven in the opposite direction, the alternate blocks are read; for example blocks 25,001 to 50,000.

As used, in the present specification, the actual physical end of the tape at block 25,000 will be the logical middle of the tape. As the tape is driven from the start at block 1 toward the physical end, it is considered as being driven on the first half of the tape. As the tape is driven from the physical end back toward the beginning, it is described as being driven on the second half of the tape.

As viewed in FIGURE 2, it will be apparent that when information is to be read from block 1, the tape may be driven past the recording head and the information recorded on block 1, indicated by the marks 20, will be transferred to suitable utilizing apparatus. If it is desired to read only a single block, the block number 1 should be moved past the reading head at a substantial constant predetermined speed. The tape will normally be started with the reading head in a position somewhere before or on the block number 50,000. The tape will be started into motion and by the time it reaches block number 1, the tape must be up to full speed, which may be, for example, about 100 inches per second. As soon as the block 1 has been read, it is desired to stop the tape before block 2 is reached. Consequently, the relative position of the reading head and tape will be such that the reading head will now be somewhere in the middle of block 49,999. The relative position of the tape with respect to the head will be such that the tape will stop in the middle of the block 49,999 so that when a signal is applied calling for the reading of block 2, the tape may be brought up to speed and will be operating at the desired speed when block 2 comes under the reading head.

By providing the alternate interlacing arrangement of the informational blocks, it will be readily apparent that the starting and stopping of the tape need not be as rigid in its requirements as would be required if the space in between the active blocks were not utilized at a later time. This arrangement will thus assure that there is maximum utilization of the tape surface in the storage of information.

FIGURE 3

Figure 3:
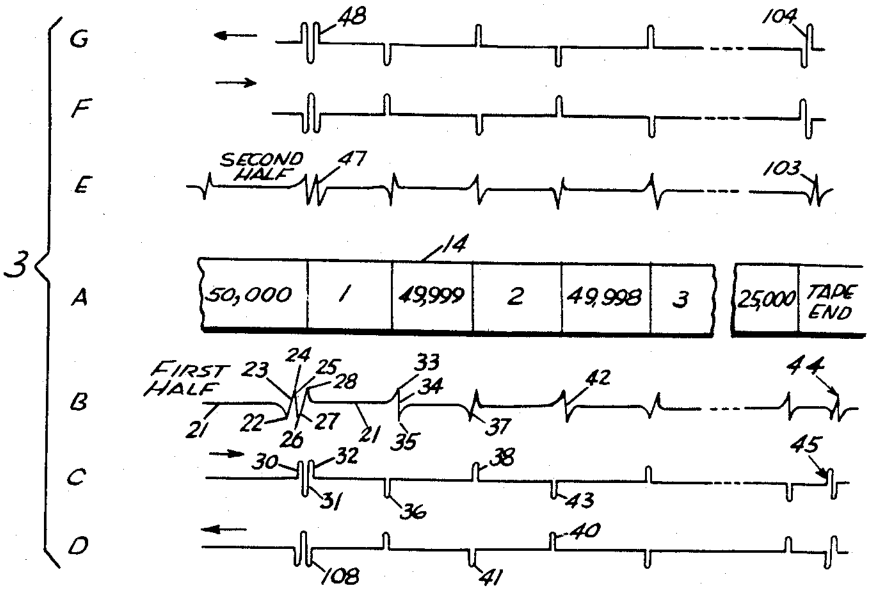
FIGURE 3 shows the tape block arrangement in combination with signals utilized in identifying the position of the blocks.

Referring now to FIGURE 3, there is shown here the basic tape arrangement shown in FIGURE 2 in combination with a magnetic marking system which permits the apparatus controlling the tape to sense the presence of the particular block which it is desired to read and to further sense when the logical middle of the tape, or physical end, has been reached, as well as when the tape has been rewound back to the beginning of the tape.

FIGURE 3A shows the tape and the tape divided into the individual blocks interlacked in the manner shown in FIGURE 2. It is again assumed that the tape of FIGURE 3A is 50,000 blocks long and that the blocks are interlaced and normally read in sequential numerical order.

The tape is normally placed on a reel and mounted on the apparatus, as shown in FIGURE 1. The tape will be in a position in which its logical beginning will be first passed under the information transfer head. This will mean that the first informational block to be read will be block number 1. When the tape is being moved so that the blocks 1, 2, 3, through 25,000 are being read, the tape will be operating on the first logical half. When the tape is being driven from the block 25,001 back to block 50,000, it will be operating on the second logical half. Inasmuch as there are two logical halves to the tape, it is essential to separate the blocks on each logical half by some means to insure that only the selected blocks are utilized. For this purpose, there are provided block mark signals which will designate in a predetermined manner the beginning and end of each block on the selected half. Since there are two logical halves of the tape, it is preferable to provide two separate block mark control signals which may be conveniently recorded on the tape. These block mark signals may be recorded in two separate channels, one block mark channel which is used for the first half and the other block mark channel which is used for the second half. These signals may be applied to the block mark channels prior to its use by a suitable block marking mechanism, not shown. FIGURE 3B shows the form of the magnetic recording placed on the block mark channel along the length of the tape 14 and the signals recorded therein are for identifying only the blocks to be used on the first half of the tape 14. In order words, the signal recorded on the tape as shown in FIGURE 3B will identify the blocks 1 through 25,000 on the tape 14.

FIGURE 3E shows the magnetic signal recorded on the block mark channel in the second track on the tape 14 and this particular signal will identify the blocks associated with the second half of the tape, namely the blocks 25,001 to 50,000.

Referring more specifically to FIGURE 3B, the signal recorded on the block mark channel for the first half of the tape 14 is arranged so that when it is desired to produce a block mark or a tape position mark, the signal recorded in the block mark channel is brought slowly from a zero level 21 to a negative value or peak 22. At point 22, there is a quick reversal of the flux applied in the block mark channel at 23 to a peak of magnetization in the opposite direction at peak 24. Following the peak 24, there is a further sharp reversal in the magnetization at 25 until the peak 26 is reached. The peak 26 is followed by a further sharp change in the magnetization at 27 until the peak 28 is reached. After the peak 28 is reached, the magnetization is slowly decreased back to the zero magnetization level 21. When a mark of the foregoing type is recorded in the block mark channel for the first half, the passing of the tape under the reading head at this particular mark, will produce an electrical output of the type shown in FIGURE 3C. This mark is indicated by a positive pulse 30 corresponding to the positive slope 23 in the magnetic recording on the block mark channel. The positive pulse 30 is followed by a negative pulse 31 which is produced by the reverse slope magnetized signal 25 on the block mark channel. The negative pulse 31 is then followed by a positive pulse 32, the latter corresponding to the changing magnetization 27 in the block mark channel.

It will be noted in the signal pattern indicated in FIGURE 3C that there is no apparent voltage produced by the changing of the flux from the zero magnetization level 21 to the peak 22 or from the peak 28 back to the zero magnetization level 21. In actual practice, there is a very slight voltage induced in the reading head but the rise time and the fall time from the zero level is so small when compared to the rise and fall time indicated by the slopes 23, 25, and 27 that the voltage induced is negligible.

As the tape shown in FIGURE 3A is continued in its motion past the reading head with the first half active as in FIGURE 3B, the next mark to pass under the head will be at the end of block number 1. This block mark is formed, as shown in FIGURE 3B, by the magnetization in the track increasing from the zero level 21 to a positive peak 33 and then sharply reversing as at 34 to a negative peak 35. The magnetization then slowly returns back to the zero level 21. The electrical output from this particular magnetization of the tape will be a negative pulse as shown at 36 in FIGURE 3C.

As the tape is continued in its movement, the magnetic signal next appearing under the reading head will be the signal represented by the sharp change in magnetization at 37. Since the slope of this change is positive, there will be produced a positive pulse 38 as shown in FIGURE 3C.

As the tape is continued in its movement past the reading head, the output of the block mark channel reading head will be as indicated in FIGURE 3C, namely a positive beginning block signal followed by a negative end block signal on each of the blocks which is active on the first half of the tape. It should be noted that the positive signal always appears at the beginning side of the active block and the negative signal appears at the end. With this logic, it is possible to utilize the positive pulse to initiate a reading operation, or a writing operation, and a negative pulse to terminate the movement of the tape.

As it is sometimes desirable to read the tape in the reverse direction while the first logical half of the tape is active, it is necessary to indicate the blocks which are active on the first logical half of the tape. With the present system for marking the blocks of the tape, it is possible to distinguish the active blocks regardless of the direction in which the tape is moved past the reading head. Thus, viewing FIGURE 3D, there is here shown the output signals from the block mark channel reading head when the tape is moved in the reverse direction. For block 2, for example, when reading from right to left, the first pulse produced will be a positive pulse 40 signifying the beginning of the block. The end of the block will be indicated by the negative pulse 41. The reason that a positive pulse 40 will be produced will be apparent when viewing FIGURE 3B and noting that when the reading head is moved from right to left past the mark 42, the mark will have a positive slope in the direction of movement to thereby produce a positive pulse. When the head is moved from left to right across the block 2, when the mark 42 is reached in the block mark channel, the slope will be negative and therefore the negative pulse 43 will be produced in the output reading head as shown in FIGURE 3C.

From this explanation, it will be readily apparent that the selected block marks on the particular logical half of the tape may be utilized when read in either direction. With block marks of the present type, it is further possible to distinguish which blocks are to be active on the selected half of the tape and further possible to disregard the blocks which it is desired to remain inactive.

As the tape is moved from block 1 to block 25,000 and beyond, it is important to provide an indication that the physical end of the tape is reached. As mentioned above, the physical end is actually the logical middle of the tape. When the physical end has been reached, there is provided a special signal 44 in the block mark channel which will produce a positive signal followed by a negative signal as indicated at 45 in FIGURE 3C. The circuitry associated with the apparatus, as shown in FIGURE 4, is capable of distinguishing this characteristic mark and introducing a signal which will shift the circuitry from the first logical half to the second logical half and consequently the control action will be shifted from the block mark channel shown in FIGURE 3B to the block mark channel for the second half shown in FIGURE 3E.

The block mark channel for this second half shown in FIGURE 3E is of the same general character as that of the first half block mark channel except that the signals recorded in this channel are arranged to define the blocks which it is desired to mark active on the second half of the tape, namely blocks 25,001 to 50,000. As with the first logical half of the tape, the beginning mark for each active block will be a positive signal and the end block mark will be a negative signal.

The signals produced in the second block mark channel are indicated in FIGURES 3G and 3F. FIGURE 3G indicates the signals produced when the tape is being moved past the recording head in the forward direction of the second logical half. FIGURE 3F designates the signal produced in the second block mark channel reading head when the tape is being moved in the reverse direction of the second logical half.

When the physical beginning of the tape has been reached, it is desired that there be a signal indicative of that fact and this will be provided by the signal 47 shown in FIGURE 3E. As the tape is being driven in the forward direction from the second half, the output signal will be as shown at 48, FIGURE 3G. That is, it will be a positive signal followed by a negative signal and then a further positive signal. Circuitry may be devised, as shown in FIGURE 4, for distinguishing the presence of this mark and effecting a desired control action therefrom.

FIGURE 4

In the apparatus shown in FIGURE 4, there is set forth a representative form of circuit capable of controlling the motion of an information storage tape in accordance with the signals stored in block mark channels on the tape. These block mark signals are utilized in co-operation with other signals generated outside of the apparatus shown in FIGURE 4 which may be generated manually or, in actual practice, by control signals from a large scale data processing machine, not shown, which is utilizing the information stored on the tape and which is controlling the tape motion in accordance with some predetermined program.

The circuitry of FIGURE 4 incorporates a series of bi-stable and mono-stable multi-vibrators or flip-flops in combination with a series of gating circuits and buffer circuits to effect the desired tape movement. The multi-vibrator circuits may take the form of any well known type of multi-vibrator which is capable of producing the outputs represented in FIGURES 6 through 9. The gating and buffer circuits are also of known type and may well take the form shown in an article by Norman Zimbel entitled "Packaged Logical Circuitry for a 4 mc. Computer," taken from the "Conventional Record of the I.R.E." 1954 National Convention, part 4. The block mark separator shown at 59 in FIGURE 4 may well take the form of the separator circuit shown in FIGURE 10, to be described below.

Figure 8:
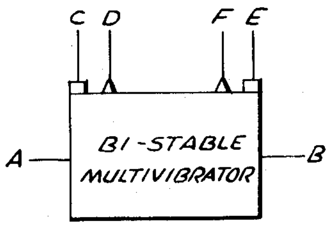
FIGURE 8 shows a further form of the electrical apparatus used in FIGURE 4.
Figure 9:
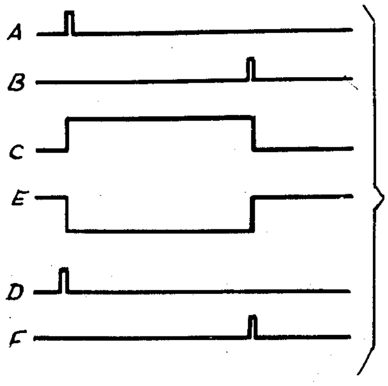
FIGURE 9 shows the electrical output associated with the electrical apparatus of FIGURE 8.

Before considering the overall operational details of FIGURE 4, reference will be made to the individual blocks of the figure to facilitate an understanding of the operation thereof. The circuit includes a read forward multivibrator 60 which is a bi-stable multi-vibrator or flip-flop of the type shown in FIGURES 8 and 9. Referring to FIGURE 8, when there is an input on line A, the multi-vibrator will be switched so that the output line C will become active and will have on the output line C a voltage that is represented in FIGURE 9C. At the same time, the output on line E will go down to a predetermined value as represented by the curve shown in FIGURE 9E. At the same time that the step appears at C, there is produced a pulse on the output line D. This pulse is shown at D in FIGURE 9.

As soon as a reset pulse is applied to the multi-vibrator on input line B, the multivibrator will be switched back to its initial state so that the voltage on C will drop back to its original value and the negative voltage on output E will come back to its original value. At the instant that the voltage E switches back from its low value, there will be produced on the output F a corresponding pulse indicated at F in FIGURE 9.

In FIGURE 4, a pulse at *rf* will cause the read forward multivibrator 60 to switch so that the output line RF will have a positive voltage as at C in FIGURE 9. The multivibrator will stay in this condition until such time as a pulse is received on the input line 61 which will switch the multi-vibrator back to its initial state. When the reset pulse occurs on the input line 61, there will be an RF reset pulse on the output of the multi-vibrator whose timing will correspond to the pulse F shown in FIGURE 9.

Other bi-stable multi-vibrators shown in FIGURE 4, are the tape position multi-vibrator 58, read reverse multi-vibrator 62, the rewind multi-vibrator 63, the movement control multi-vibrator 64, the direction control multi-vibrator 65 and the active half of tape multi-vibrator 66. These will correspond in general detail to the multivibrators shown in FIGURE 8. It will be noted that the multi-vibrators 58 and 66 have single-ended inputs. These multi-vibrators 58 and 66 are adapted to change bistable state each time an input signal is received. This type of bistable circuit is sometimes referred to as a single binary counter stage.

Figure 7:
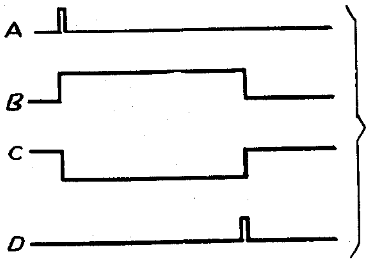
FIGURE 7 shows the electrical output of the apparatus of FIGURE 6.

Also included in FIGURE 4 are mono-stable multivibrators or flip-flops such as shown at 67 and 68. These multi-vibrators may well be of the type shown in FIGURE 6 wherein the application of an input pulse on input line A of FIGURE 6, as represented in FIGURE 7A, will switch the multi-vibrator into an active state so that the output line B will rise in voltage and the output line C will drop in voltage for a predetermined time depending upon the time constants of the circuit. After a predetermined time, the multivibrator will switch from the high voltage state on output line B back to a low value while the output line C will switch from a low value back to a high value. As soon as this switching occurs, there will be a pulse on the output line D as represented by the pulse D in FIGURE 7.

A further mono-stable multi-vibrator circuit will be found in the reversal delay multi-vibrator 69.

Also shown in FIGURE 4 are a pair of reading heads 71 and 72. The reading head 71 is arranged to communicate with the block mark signals in the block mark channel for the forward logical half of the tape. The reading head 72 is arranged to co-operate with the block mark channel associated with the second half of the tape. The outputs of the heads 71 and 72 are fed through appropriate amplifiers to a pair of gating circuits 73 and 74. The gates 73 and 74 are of the type which are operating class A when the biasing gate legs 73A and 74A are active.

In order to facilitate an understanding of the operation of FIGURE 4, there is listed below a symbol identification chart showing the various functions used in the circuit of FIGURE 4 and FIGURE 5.

*rf*—Read forward } Input pulses
*rr*—Read reverse } Input pulses
*rw*—Rewind } Input pulses
RF—Read forward order storage
RR—Read reverse order storage
RW—Rewind order storage
FH—First half of tape active
SH—Second half of tape active
ET—End of tape
$\overline{ET}$—On active part of tape
TM—Tape move
TB—Tape brake
TF—Tape forward } Effective only when TM is on
TR—Tape reverse } Effective only when TM is on
P—Positive block mark
$P_D$—Positive pulse delayed
N—Negative block mark
PS—Output active for time period after P
$\overline{PS}$—output active all the time except for a time period after P
$\overline{NS}$—Output active all the time except for a time period after N Insofar as the over-all operation of FIGURE 4 is concerned, it is intended that when the tape has just been put in position and there is an input read forward signal, *rf*, that the output tape move line TM become active and the tape forward line TF become active. When the reel is first mounted in the apparatus shown in FIGURE 1, the tape will be so arranged that the first block up for examination will be block number 1 shown in FIGURE 3.

As soon as the tape is in position and it is desired to initiate a reading operation, a read forward pulse, *rf*, will be applied to the read forward multivibrator 60. This will set the read forward multivibrator in the active state so that the output line RF will be active or have a higher voltage. This voltage will be applied to a buffer line 75 which feeds the input gate leg 76 of gate 77. The other gate input leg 78 is connected to the reversal delay multivibrator 69 and this leg will normally have a high or active voltage applied thereto so that the gate 77 will be open. Consequently, a voltage will be applied to the movement control multi-vibrator 64 which will set the multivibrator from its initial state with line TB active to the tape move condition so that an active voltage will appear upon the tape move output line TM. This will mean that the output line tape brake TB will be inactive and the control circuitry for moving the tape will be conditioned so that a tape direction signal may be received.

The read forward voltage RF from the read forward multivibrator 60 will also be applied to a gate 79 on the input of the direction control multi-vibrator 65. Also applied to the input of the gate 79 will be a signal from the output of the active half of the tape multi-vibrator 66 which will have an active voltage on the forward half output lead FH connected to the input gate leg 80. This multi-vibrator may be set manually at the start so that the lead FH is active. Since the gate 79 will open with both input legs active, the direction control multi-vibrator 65 will be switched so that the output line TF or tape forward line will be activated. If it was already in this condition, it will remain that way. The tape forward signal, in combination with the tape move signal, will start the tape driving mechanism to move the tape past the reading head in the forward direction. As viewed in FIGURE 3C, the first signal to be detected will be a series of three pulses 30, 31 and 32, the pulse 30 being positive, 31 negative and 32 positive. The positive pulse 30 will be passed through the block mark separator 59 and there will appear on the output thereof a positive pulse at P. Forty microseconds later, the negative pulse 31 will appear at N as a positive pulse. Again, forty microseconds later, the positive pulse will appear at P.

Figure 4A:
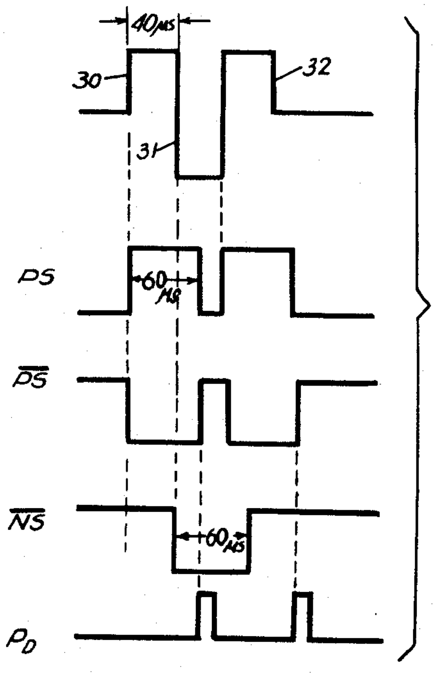
FIGURE 4A is a timing chart for one of the pulse circuits of FIGURE 4.
Figure 4:
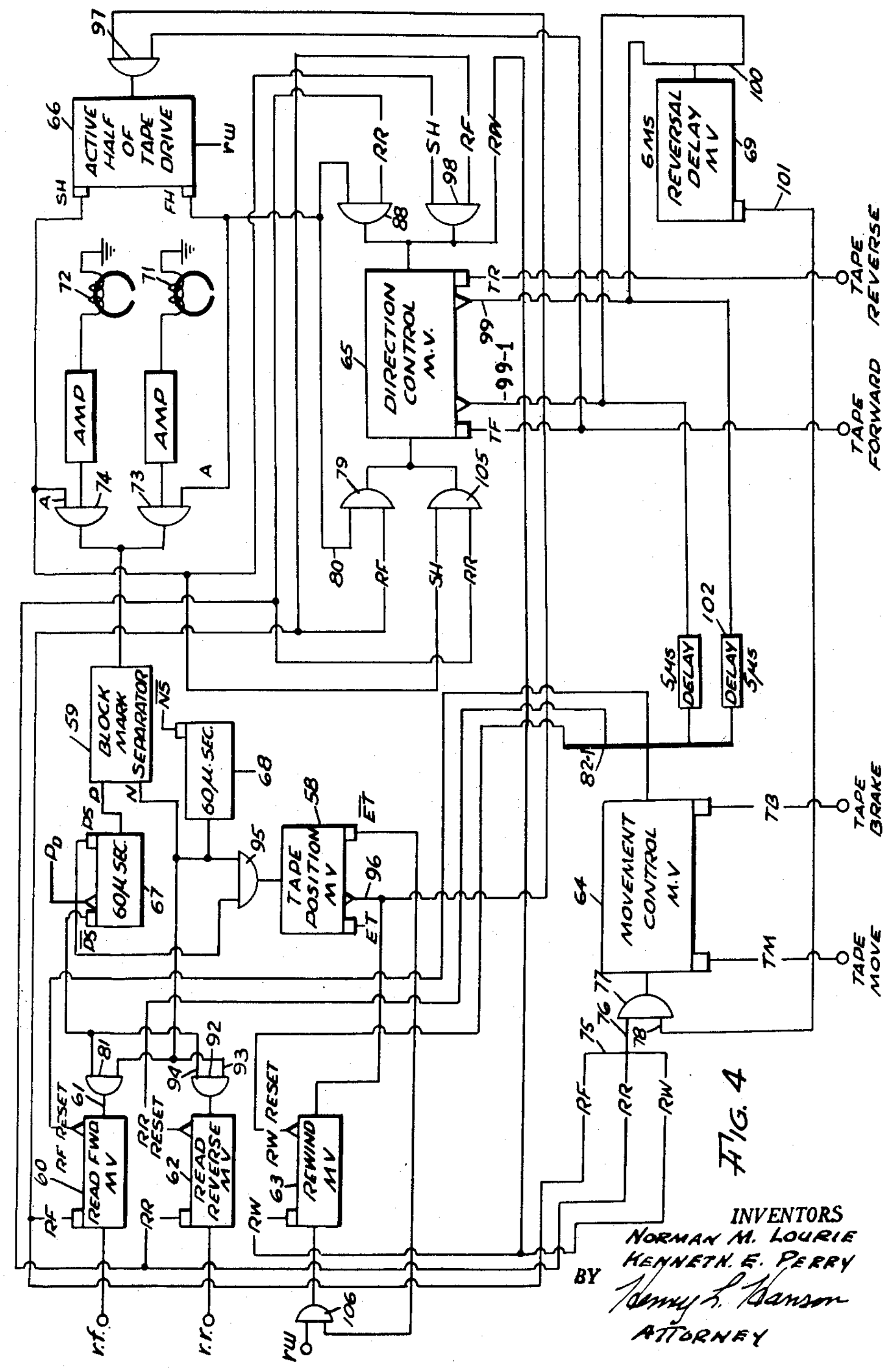
FIGURE 4 is a schematic showing of a tape motion control circuit which will utilize the signals shown in FIGURE 3.

In FIGURE 4A, the relationship of the pulses 30, 31 and 32 is shown in expanded detail. Each of the pulses is forty microseconds in duration. These pulses are applied to the monostable multi-vibrators 67 and 68 and the output steps are on a sixty microsecond timing basis. When the output line PS is active, this voltage, along with the signal from the output N from the block mark separator 59, will be applied to the gate 95 on the tape position multi-vibrator 58 to switch it so that the output line $\overline{ET}$ is active to indicate the active part of the tape is now under the reading head. The next effective control pulse will appear on line $P_D$, second occurrence in FIGURE 4A, which will be applied to the input gate 82.

Figure 5:
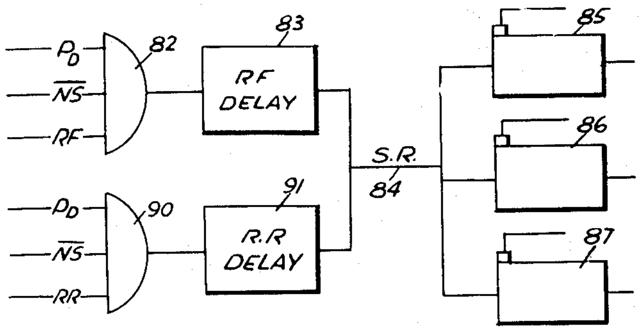
FIGURE 5 is a schematic showing of further apparatus for using the signals shown in FIGURE 3.
Figure 6:
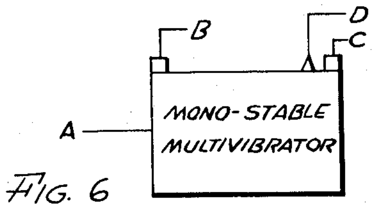
FIGURE 6 is a diagrammatic showing of one form of electrical apparatus used in FIGURE 4.

At the instant that the positive pulse on line $P_D$ is applied to the gate 82, in FIGURE 5, the input gate leg $\overline{NS}$ will be active and the read forward gate leg RF will be active so that a pulse will be applied to the read forward delay circuit 83. The output of the delay circuit 83 will in turn be applied to a start read line 84 which connects to a series of read signal storage multi-vibrators 85, 86 and 87, each of which are arranged to control the reading circuits of associated reading heads on selected channels on the tape. These read signal multi-vibrators will be active for a predetermined length of time which may be determined by any of several indicating means, not shown, which will detect when the particular block of information on the tape has been read into the associated processing machine. After the information has been read from the block, the read storage devices will each be reset to an inactive state. The delay circuit 83 is provided to insure that no reading operation will take place until the outside limits of the block have been reached. All of the inputs to the circuitry of FIGURE 5 are derived from the circuitry of FIGURE 4.

The apparatus of FIGURE 4 will continue to drive the tape in the forward direction until a negative block mark signal is detected as at 36 in FIGURE 3 at C. When this negative signal is detected, there will be an output from the block mark separator 59 which will apply a pulse to the gate 81 connected to the input 61 of the read forward multivibrator 60. If a positive pulse was not received before the negative pulse was received, the output of the mono-stable multi-vibrator 67 at line $\overline{PS}$ will be active and the gate will pass a signal to input line 61 on the read forward multi-vibrator 60. This will switch the read forward multi-vibrator 60 back into the inactive state and when the switching takes place a read forward reset pulse will appear in the output and this read forward reset pulse will be applied to the buffer line 82–1 on the input of the movement control multi-vibrator 64. The presence of the pulse on the movement control multi-vibrator 64 will switch the multi-vibrator to the tape brake position at which time the tape will be stopped.

As viewed in FIGURE 3A, if block number 1 has been read, the tape 14 will be brought to rest under the information transfer head somewhere in the middle of the block 49,999. The apparatus will remain in that position until a further signal directing tape movement is received.

If another read forward pulse *rf* is applied to the read forward multi-vibrator 60, the apparatus will be operative in the aforedescribed manner and the information from block 2 will be read. After the information from block 2 has been read, the tape will stop with the tape block 49,998 now being under the reading head.

If it should be desired to read block 2 after it has already been passed under the reading head, a read reverse signal *rr*, will be applied to the input of the read reverse multi-vibrator 62. When the read reverse multivibrator 62 is switched, the output line RR will be active and this read reverse signal will be applied to the gate 77. The gate 77 will be open as there will be a voltage on the output of the multivibrator 69 on the gate leg 78 and the movement control multivibrator will be switched from the tape brake condition over to the tape move condition so that the output line TM will be active.

The read reverse signal RR will also be applied to the gate 88 on the input of the direction control multi-vibrator 65. The other input leg to the gate 88 will be active as the tape half signal line FH will be active. Consequently, a signal will be applied to the direction control multi-vibrator 65 to switch the multi-vibrator to the tape reverse condition so that the output line TR will now be active.

When the direction control multi-vibrator 65 is switched, an output pulse will appear on lead 99 which will trigger the reversal delay multi-vibrator 69. This will drop the voltage in the line 101 and thereby close gate 77 for a predetermined period of time after which the gate will again be activated. This prevents the undue straining of the tape.

With the tape reverse line TR active, the tape will be driven in the opposite direction. As the tape is moved in the opposite direction, the pulse configuration shown in FIGURE 3D will be effective and insofar as block 2 is concerned, the first pulse detected will be pulse 40. Pulse 40 is a positive pulse and, since there has been no negative pulse preceding this positive pulse, the gate 90 in FIGURE 5 will be open upon the occurrence of pulse $P_D$ to activate the read reverse delay package 91 and subsequently activate the start read line 84 which feeds the respective read storage multi-vibrators 85, 86 and 87.

The tape will continue to move in the reverse direction until the negative pulse 41 is received and appears as an output pulse on the output of the block mark separator. This negative pulse is applied to the gate 92 on input leg 93. The other input leg 94 is on the output of the delay multi-vibrator 67 and since there was no positive pulse preceding the negative pulse, the gate leg 94 will be active so that a pulse will be applied to the read reverse multi-vibrator 62 to reset the multi-vibrator and deactive the output line RR. When the read reverse shift occurs, there will be a read reverse reset pulse on the output of the multi-vibrator 62 which in turn is applied to the buffer line 82 on the input of the movement control multi-vibrator 64. This will switch the control multi-vibrator 64 back to the tape brake condition. This will bring the tape to a stop with the block 49,999 being directly under the reading head.

Next to be considered is the signal which indicates that the logical middle of the tape or the physical end of the tape has been reached. After the tape has been driven past block 25,000 and a subsequent read forward signal is applied, the tape will continue moving from right to left. When the block mark channel head 71 reads the pulse signal 44, the output thereof will be as indicated at 45, namely a positive pulse followed immediately by a negative pulse.

When the positive pulse appears on the output line P of the block mark separator, the delay multi-vibrator 67 will be set so that the output line PS will be active. As soon as the negative pulse is received from the output of the block mark separator, the two pulses will combine on the input of the gate 95 and this will, in turn, switch the tape position multi-vibrator from the not end of tape output $\overline{ET}$ to the ET condition. At the same time, there will be an output pulse on the output lead 96 indicating an end of tape transition and this pulse will be applied to the input gate 97 on the input of the active half of the tape multi-vibrator 66. At the same time, the direction control multi-vibrator 65 will have its output line TF calling for a tape forward movement and this will likewise be applied to the input of the gate 97. With both of the input legs of the gate 97 active, the multi-vibrator 66 will switch so that the output which is now active will be the second half line SH. With the read forward line RF active and with the second half of the tape active, the gate 98 on the input of the direction control multi-vibrator 65 will now be open and the pulse will be applied to the direction control multi-vibrator 65 to set this multi-vibrator in the tape reverse position. As the tape reverse line is activated, there will be a pulse produced on the output line 99 of the direction control multi-vibrator 65 and this pulse will be applied through a buffer input line 100 which is connected to the reversal delay multi-vibrator 69. As soon as this multi-vibrator is activated, the output line 101 will drop so that the gate 77 will be closed for approximately 6 milliseconds. At the same time that the pulse on the lead 99 is applied to the buffer line 100, the pulse is also applied to a delay line 102 which in turn connects to the buffer line 82–1 on the input of the movement control multi-vibrator 64. This will set the movement control multi-vibrator in the tape brake position and the tape will be brought to a stop. The tape will remain stopped until the output line 101 and the input leg 78 of the gate 77 again becomes active after a predetermined time delay which may be as stated above, about 6 milliseconds. The reversal delay multi-vibrator 69 will, after the predetermined delay, become active and the gate 77 will open so that the read forward signal on the buffer line 75 will be applied to the movement control multi-vibrator 65 which will again switch to the tape move position. With the tape move line active and the tape reverse active, the tape will now be moved in the forward direction on the second logical half of the tape. The reversal delay multi-vibrator is arranged to stop the tape before it is driven in the opposite direction to prevent the over-straining of the tape.

The directional control multi-vibrator 65 has a pulse output on lead 99 or 99–1 whenever the multi-vibrator calls for a change in the direction of tape movement. These signals are used to provide a tape brake signal TB by way of the movement control multi-vibrator 64 and to also provide an input signal to the reversal delay multi-vibrator 69.

The pulses received on the block mark channel for the second logical half at the receiving head 72 will be those shown in FIGURE 3G. The first signal to appear as the tape direction has been reversed will be the signal 103 which will produce an output signal in the head 72 corresponding to the pulse 104, namely a positive pulse followed by a negative pulse. With the second half of the tape active, the gate 74 will be open so that the output of the amplifier associated with the reading head 72 will pass through the gate and be applied to the block mark separator. The positive pulse will be fed into the delay multi-vibrator 67 and will switch the multi-vibrator so that the output line PS is active and at the same time will produce a signal which will be applied to one of the input gate legs of the gate 95 on the tape position multi-vibrator 58. As soon as the negative pulse is received from the block mark separator, this negative pulse will also come in on the input gate leg of the gate 95 and the tape position multi-vibrator will be switched so that the not end of tape line $\overline{ET}$ will now be effective.

The negative pulse on the output of the block mark separator is also applied to the delay multi-vibrator 68 so that the output line $\overline{NS}$ is inactive. Consequently, the gate 82 in FIGURE 5 will be inactive and will remain inactive until after the positive pulse line $P_D$ has a pulse thereon and it is received at the gate 82. Consequently, there is no signal calling for the reading of any block.

The tape will continue to move in the physically reverse direction, the forward direction of the second half, until such time as a positive pulse is received from block 25,001. This positive pulse will then activate the start read line 84 of FIGURE 5 and the reading of the block will take place. As soon as the next negative pulse is received, the negative pulse will pass through the gate 81 and reset the read forward multi-vibrator 60 so that the output line RF will be inactive. At the same time, the multi-vibrator 60 will produce an output pulse, RF reset, which will be applied to the buffer line 82 on the input of the movement control multi-vibrator 64 to switch the multi-vibrator to the tape brake condition.

Tape movement may again be initiated by applying a read forward pulse or a read reverse pulse to the inputs of the multi-vibrator 60 or 62.

When operating on the second half of the tape, the actuation of the read reverse multi-vibrator 62 will condition the gate 105 which will now open since the multi-vibrator 66 has been switched to the second half condition. This will then switch the direction control multi-vibrator 65 so that the output line TF will be active and the tape will drive in the physical forward direction or the logical reverse direction. This driving will continue until a negative pulse is received and the movement control multi-vibrator 64 is reset to the tape brake condition.

With the second half of the tape active and with continued application of read forward signals, the tape will eventually be moved to a point where the initial block mark signals 47 will be detected and be reproduced as at 48. As shown in FIGURE 3G, the pulse 48 is actually arranged into three pulses; namely a positive pulse, a negative pulse, and finally a further positive pulse. The first positive pulse and the negative pulse will be effective in the same manner as the pulse 45 in FIGURE 3C to switch the tape position multi-vibrator 58 to the end of tape condition with the output line ET active. The second positive pulse in the series 48 will be effective to set up the start read circuits shown in FIGURE 5 so that block number 50,000 will be read. As soon as the end block mark signals for the block 50,000 has been read, the tape will stop. The end of tape line ET may be used to indicate to an operator that the end of the tape has been reached and the last block of information has been read. This signal may also be used to switch in another tape mechanism into the main processing machine.

Should it be desired to rewind the tape when the tape is anywhere in the first half or second half, it is but necessary to apply an input pulse *rw* to the rewind multi-vibrator 63. This rewind pulse *rw* will pass through the input gate 106 if the tape position multi-vibrator is set indicating that the tape is not at an end of tape position. With the rewind multi-vibrator 63 active, the output line thereof RW will be active and will apply an input signal to the gate 77 of the movement control multi-vibrator 64. Gate 77 will be momentarily closed if a switching of the tape direction multi-vibrator has occurred due to the action of the delay multi-vibrator 69. After the switching, the gate 77 will be open and the movement control multi-vibrator 64 will be switched to the tape move position. At the same time, this rewind signal RW will be applied to the input of the direction control multi-vibrator 65 and this will switch the multi-vibrator to the tape reverse condition activating the output line TR. At the same time that the rewind pulse *rw*, is applied to the gate 106, it will also be applied to the active half of tape multi-vibrator 66 and will reset the multi-vibrator to the forward half condition. The tape will rewind until a signal is received indicating that the rewind is completed. This rewind signal will correspond to the signal pulse series 108. The pulse series 108 is a negative pulse followed by a positive and then followed by a further negative pulse. The first positive pulse and the second negative pulse will be effective to switch the tape position multi-vibrator 58 to the end of tape condition at which time an output pulse will appear upon the line 96 and this pulse will be fed directly to the rewind multi-vibrator 63 to switch the multi-vibrator 63 back to its inactive state. The switching operation will produce an output pulse on the rewind reset line RW reset which in turn will apply a pulse to the buffer 82 on the input of the moving control multi-vibrator 64. This will switch the moving control multi-vibrator 64 to the tape brake condition and the tape movement will be stopped.

From the foregoing it will be seen that the apparatus of FIGURE 4 is capable of instituting movement of the tape in any desired direction and that the information on the tape may be selectively read therefrom in accordance with whether or not the tape is operating on the forward half or the second half of the tape. Further, the tape direction may be reversed while continuing the call for a driving signal in the logical forward direction.

Figure 10:
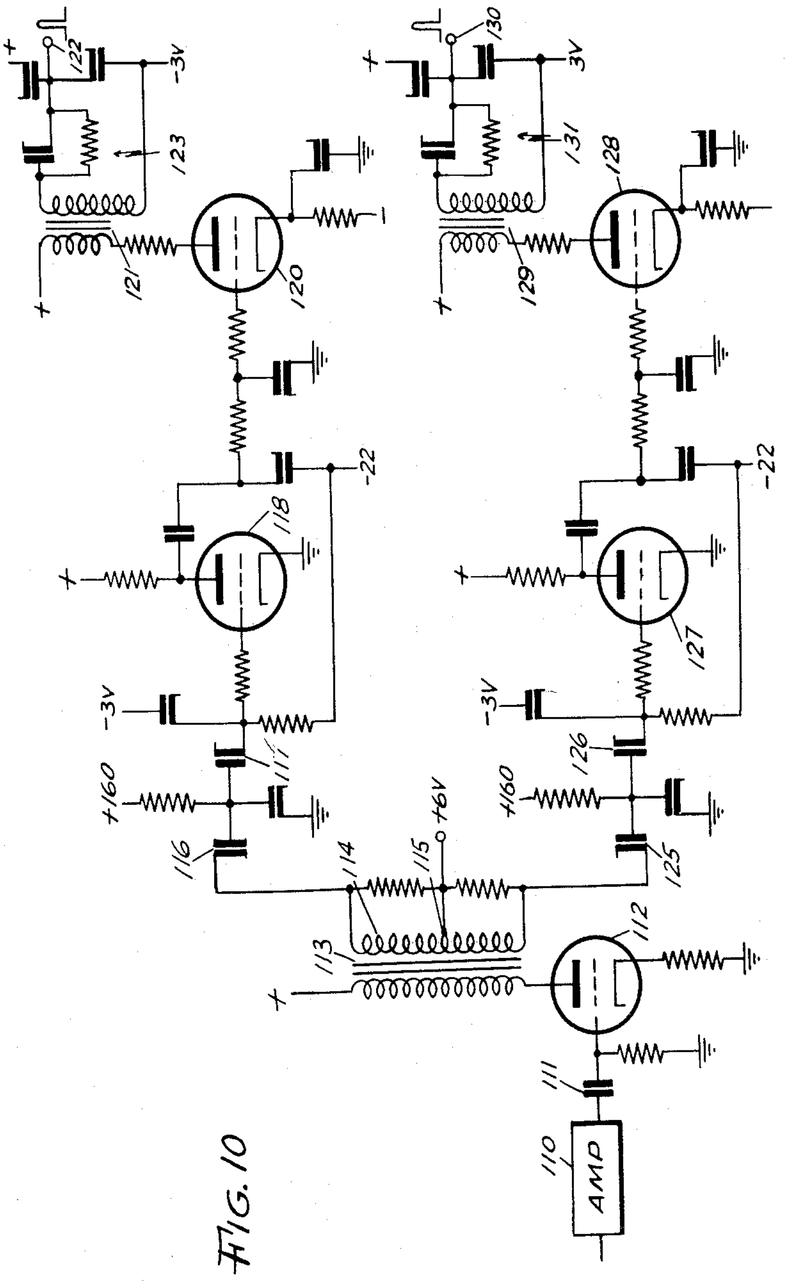
FIGURE 10 is a schematic of a signal separating apparatus of the type used in FIGURE 4.

The block mark separator used in FIGURE 4 is shown schematically in FIGURE 10 and will be seen to comprise, as shown in FIGURE 10, an amplifier section 110 having an input which is fed from one or the other of the block mark channel reading heads 71 or 72. The output of the amplifier 110 is coupled by way of a condenser 111 to the input of a further amplifier 112 whose output is applied to a transformer 113 having a secondary winding 114 tapped at 115. The center tap 115 is connected to a voltage supply which may be, for example, about six volts positive. The upper end of the secondary 114 is coupled by way of a diode 116 and a further diode 117 to the input of an amplifier stage 118. The output of the amplifier tube 118 is condenser coupled to the input of an output amplifier stage 120. The output of this amplifier tube 120 is transformer coupled to an output terminal 122. An output circuit 123 is coupled to the output of the transformer 121 in order to clip and shape the output pulse at terminal 122 so that the pulse is a sharp positive pulse.

The lower end of the transformer secondary 114 is coupled by way of a diode 125 and another diode 126 to the input of an amplifier tube 127. The output amplifier 127 is condenser coupled to the input of a final amplifier stage 128. This amplifier has a transformer 129 in the output thereof and this output will appear on the output terminal 130. A pulse clipping and shaping circuit 131 is connected to the output of the transformer 129 to insure that on terminal 130 there is a single sharp positive pulse present.

The diodes associated with the inputs and outputs of the amplifier tubes 118 and 127 are to clip the voltages from the transformer, clamp them to a predetermined voltage, and limit the pulse amplitude to a desired magnitude. This tends to improve the over-all wave shape present on the output terminals 122 and 130.

The actual block separation takes place in the transformer 113 and the diodes associated therewith which will be effective to pass the positive pulses from amplifier 110 through the diode 116 and the negative pulses from the amplifier 110 through the diode 125.

From the foregoing, it will be readily apparent that there has been provided a new and improved information storage apparatus wherein the record tape is arranged for ready access to the information that is stored on the tape. Further, there has been provided a new and novel arrangement for controlling the operation of a storage tape by a block mark signal system which readily identifies the active part of the storage tape. While a preferred embodiment of the invention has been shown, it will be readily apparent to those skilled in the art that changes may be made in the invention without departing from the spirit thereof as set forth in the appended claims.

What is claimed is:

1. Data storage apparatus comprising an elongated record tape adapted to be reversibly driven, said record tape being divided into two halves each of which comprises a plurality of blocks alternately interlaced with the blocks of the other half, a block mark indicator record on said tape for each of said blocks, said block mark indicator record comprising means for selectively identifying the blocks of each half regardless of the direction of motion of said tape, data transfer means positioned relative to said tape to derive therefrom signals indicative of said block mark indicator record and produce tape movement controlling signals to effect the transfer of information relative to said tape, an end of tape indicator record on said tape, and means actuated by said end of tape record so that said data transfer means will be selectively active with the blocks of said first half or said second half.

2. A record tape control apparatus comprising a tape having interlaced blocks of a first and second logical half, reversible tape driving means for said tape, means indicating when said tape has reached the physical end thereof, means including said last named means for activating said tape driving means to drive said tape in the opposite direction, an information transfer head for said tape, means activating said information transfer head on the blocks of the first half until said tape end indicating means is actuated and means activating said information transfer head on the blocks of the second half when said tape end indicating means has been actuated.

3. A magnetic record tape control apparatus comprising a tape having interlaced blocks of a first and second half, reversible tape driving means for said tape, electrical signal actuated means indicating when said tape has reached the physical end thereof, means including said last named means for activating said tape driving means to drive said tape in the opposite direction, an information transfer head for said tape, means including a first set of signals derived from said tape for activating said information transfer head on the blocks of the first half until said tape end indicating means is actuated, and means including a second set of signals derived from said tape for activating said information transfer head on the blocks of the second half when said tape end indicating means has been actuated.

4. Data storage apparatus comprising an elongated record tape adapted to be reversibly driven, said record tape being divided into two halves each of which comprises a plurality of blocks alternately interlaced with the blocks of the other half, a block mark indicator record on said tape for each of said blocks, block mark indicator record detecting means comprising means for selectively identifying the blocks of each half regardless of the direction of motion of said tape, a block selection control means adapted to have a first output signal or a second output signal, means including a data transfer means positioned relative to said tape to derive therefrom signals indicative of said block mark indicator records, and means connected to be responsive to said block mark indicator records and to said control means to effect a data transfer relative to the blocks on one-half of the tape upon the presence of said first output signal and to effect a data transfer relative to the blocks of said other half of the tape upon the presence of said second output signal.

5. Data storage apparatus comprising an elongated record tape adapted to be reversibly driven, said record tape being divided into two halves each of which comprises a plurality of blocks alternately interlaced with the blocks of the other half, a first block mark indicator record on said tape for each of the blocks of the first half of said first tape, a second block mark indicator record on said tape for each of the blocks of the second half of said tape, an end-of-tape record indicator on said tape, an end-of-tape record sensing means, an end-of-tape record signal storage means connected to said sensing means and having a first output before said end-o-tape record is sensed and a second output after said end-of-tape record is sensed by said sensing means, data transfer means positioned adjacent said tape to transfer signals therebetween, tape reading means positioned adjacent said tape and being responsive to the block mark indicator records connected to control said data transfer circuit means, and circuit means including said tape-reading means connected to said data transfer means and being responsive to said end-of-tape indicator record as stored in said storage means to render said first block mark indicator record effective to control said data transfer means when said storage means has said first output and said second block mark indicator record effective to control said data transfer means when said storage means has said second output.

6. Data storage apparatus comprising an elongated record tape adapted to be reversibly driven, said record tape being divided into two halves each of which comprises a plurality of blocks alternately interlaced with the blocks of the other half, a first block mark indicator record track on said tape for each of the blocks of the first half of said tape, a second block mark indicator record track on said tape for each of the blocks of the second half of said tape, an end-of-tape indicator record on said tape, data transfer means positioned adjacent said tape to transfer data with respect to said tape, means including said data transfer means being responsive to the block mark indicator records connected to control the movement of said tape, means responsive to said end-of-tape indicator record and adapted to store a first signal indicative of the absence of an end-of-tape indicator record and a second signal indicative of the presence of an end-of-tape indicator record, and means connected to said last-named means to render said first block mark indicator record effective to control said data transfer means relative to the blocks of one-half of the tape when said first signal is sensed and said second block mark indicator record effective to control said data transfer means relative to the blocks of the other half of the tape when said second signal is sensed.

7. Data storage apparatus comprising an elongated record tape adapted to be reversibly driven, said record tape being divided into two halves each of which comprises a plurality of blocks alternately interlaced with the blocks of the other half, a first block mark indicator record track on said tape for each of the blocks of the first half of said tape, a second block mark indicator record track on said tape for each of the blocks of the second half of said tape, an end-of-tape indicator record on said tape, data transfer means positioned adjacent said tape and said first and second record tracks to transfer signals with respect to said tape, circuit means responsive to the block mark indicator records derived from said tape and being connected to control said data transfer means, and circuit means responsive to said end-of-tape indicator record derived from said tape and being connected to selectively switch the control of said data transfer means between said first and said second block mark indicator record tracks.

8. Data storage apparatus comprising an elongated magnetic record tape adapted to be reversibly driven, said record tape being divided into two halves each of which comprises a plurality of blocks alternately interlaced with the blocks of the other half, a first magnetic block mark indicator record track on said tape for each of the blocks of the first half of said tape, a second magnetic block mark indicator record track on said tape for each of the blocks of the second half of said tape, a magnetic end-of-tape indicator record on said tape, a multiple track data transfer means positioned adjacent said tape and said first and second magnetic record tracks to transfer signals with respect to said tape, first circuit means responsive to the block mark indicator records in one or the other of said record tracks derived from said tape by said data transfer means being connected to control said data transfer means, and second circuit means responsive to said end-of-tape indicator record derived from said tape by said data transfer means and being adapted to store a first signal prior to the sensing of said end-of-tape indicator record and a second signal after the sensing of said end-of-tape indicator record, means including means responsive to the first signal from said second circuit means connected to activate said data transfer means with respect to the blocks of the first half of the tape, and means including means responsive to the second signal from said second circuit means connected to activate said data transfer means with respect to the blocks of the second half of the tape.

9. Data storage apparatus comprising an elongated record tape adapted to be reversibly driven, said record tape being divided into two halves each of which comprises a plurality of blocks alternately interlaced with the blocks of the other half, a block mark indicator record on said tape for each of said blocks, said block mark indicator record comprising means for selectively identifying the blocks of each half regardless of the direction of motion of said tape, data transfer means positioned relative to said tape to derive therefrom signals indicative of said block mark indicator record and produce tape movement controlling signals to effect the transfer of information relative to said tape, a logical middle-of-tape record on said tape, and means including said data transfer means actuated by said middle-of-tape record when the tape has been moved to a predetermined position along the first half of the tape, said last-named means being connected to render said data transfer means effective on the alternate blocks of the first half of the tape when not actuated by said middle-of-tape record and to render said data transfer means effective on the alternate blocks of the second half of the tape when actuated by said middle-of-tape record.

References Cited in the file of this patent

UNITED STATES PATENTS

| | | |
|---|---|---|
| 2,364,556 | Somers | Dec. 5, 1944 |
| 2,496,047 | Goddard | Jan. 31, 1950 |
| 2,514,578 | Heller et al. | July 11, 1950 |
| 2,637,785 | Charlin | May 5, 1953 |
| 2,692,728 | Strickler | Oct. 26, 1954 |
| 2,702,833 | Camras | Feb. 22, 1955 |
| 2,782,398 | West | Feb. 19, 1957 |
| 2,900,132 | Burns et al. | Aug. 18, 1959 |
| 2,905,930 | Golden | Sept. 22, 1959 |